United States Patent [19]
Bates et al.

[11] 3,786,511
[45] Jan. 15, 1974

[54] RECORDING APPARATUS

[75] Inventors: John Joseph Bates, Hednesford; Eric Arthur Jackson; Gordon Smith, both of Burton upon Trent, all of England

[73] Assignee: Coal Industry (Patents) Limited, London, England

[22] Filed: May 3, 1973

[21] Appl. No.: 356,941

[30] Foreign Application Priority Data
May 11, 1972 Great Britain............... 22,144/72

[52] U.S. Cl.............................. 346/33, 346/49
[51] Int. Cl................................................. G01d
[58] Field of Search....................... 73/391, 411; 346/33 TP, 40, 72, 33 R, 49; 175/40

[56] References Cited
UNITED STATES PATENTS

| | | | |
|---|---|---|---|
| 2,666,585 | 1/1954 | Gess | 73/391 |
| 3,678,758 | 7/1972 | Lawrence | 73/411 |
| 1,889,089 | 11/1932 | Giers | 346/72 |

*Primary Examiner*—Richard B. Wilkinson
*Assistant Examiner*—Pat Salce
*Attorney*—Richard K. Stevens et al.

[57] ABSTRACT

The recorder comprises a hydraulic pressure recorder section and a mechanical movement detector section which enable the recorder simultaneously to monitor the hydraulic pressure in mine roof support system and the roof convergence. The hydraulic pressure recorder section comprises a coiled, hollow Bourdon tube gauge interconnected to an arm which carries a chart marking pen. The mechanical movement detector section comprises a spring loaded drum assembly which is rotated by a Bowden cable secured at its other end to two relatively movable members of the roof support, the members being moved relative to one another upon convergence of the mine roof. Rotation of the spring loaded drum assembly moves a further arm which carries a further chart marking pen.

6 Claims, 1 Drawing Figure

PATENTED JAN 15 1974 3,786,511
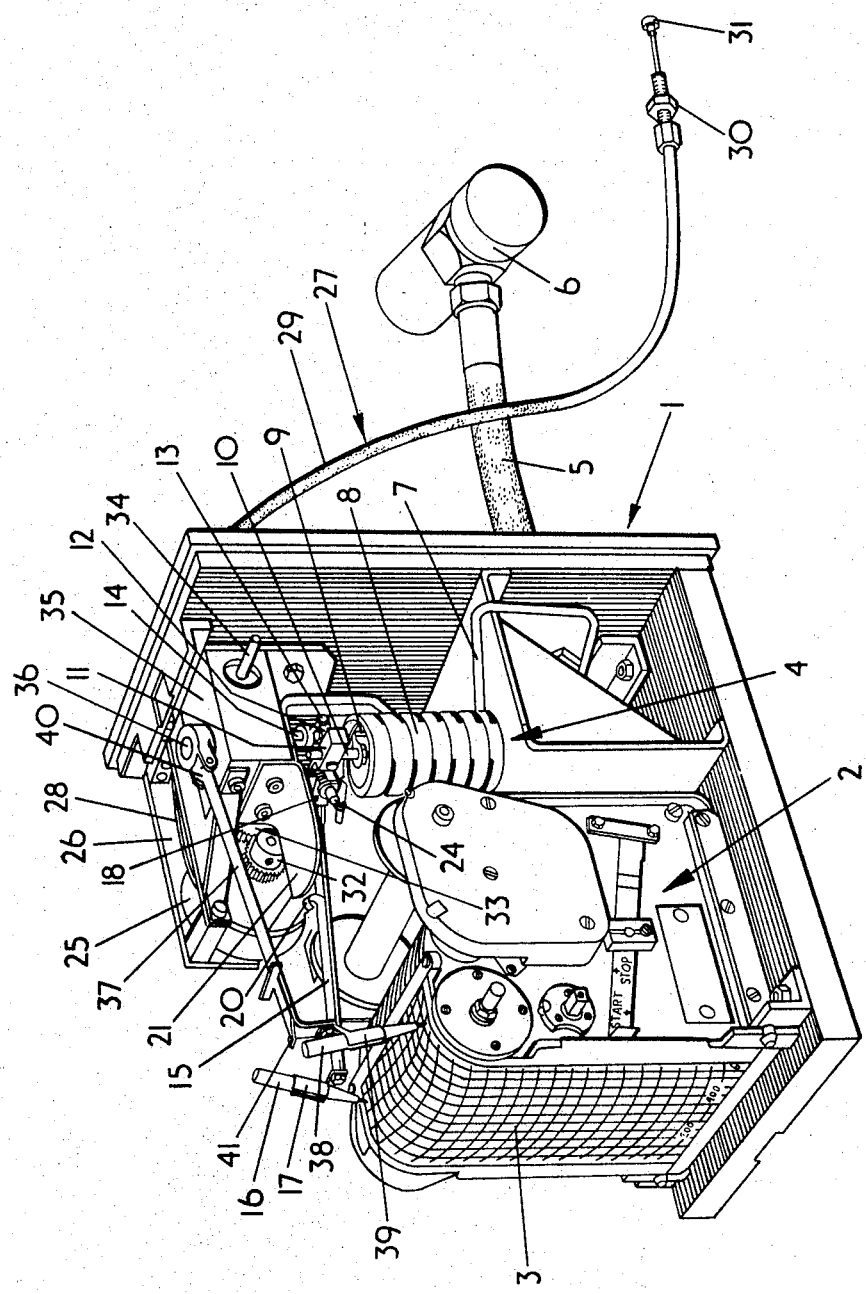

RECORDING APPARATUS

This invention relates to recording apparatus suitable for use in an underground mine such as, for example, recording apparatus for simultaneously recording hydraulic pressure e.g. the hydraulic pressure in a roof support system and recording displacement of two members with respect to each other e.g. the roof and floor members of the roof support.

An object of the present invention is to provide recording apparatus suitable, inter alia, for recording the hydraulic pressure in a roof support system and simultaneously the roof convergence adjacent to the roof support.

According to the present invention, recording apparatus compriseS a housing, detector means sensitive to hydraulic pressure, hydraulic connector means for connecting the detector means to a source of hydraulic pressure, an arm connected to the detector means and movable in response to movement of the detector means, the arm being provided with marker means for marking a moving chart, a Bowden cable adapted at one end for attachment to two relatively movable members and being attached at the other end to the housing and to a spring loaded drum assembly, and a mechanism interconnecting the spring loaded drum assembly to a further arm movable in response to rotation of the drum, the further arm being provided with further marker means for marking a moving chart.

Preferably, the mechanism comprises gears and a gearbox and a stop may be provided to limit the amount of rotation of the gears.

Advantageously, the spring loaded drum assembly comprises a drum formed with a helical grove for the associated part of the Bowden cable.

Conveniently, the marker means and the further marker means comprise pens which are pivotally mounted on the associated arm to facilitate adjustment of the pen tip relatively to the associated arm.

Preferably, each arm is provided with a spring loaded clip arranged to locate on an abutment provided on the housing when the marker means is disengaged from contact with the chart.

Preferably, the arms are pivotally mounted and the abutments are curved to facilitate contact by the associated clip irrespective of the marker means position across the chart.

By way of example only, one embodiment of the present invention will be described with reference to the accompanying drawing which shows a perspective view of recording apparatus constructed in accordance with the present invention.

The drawing shows the recording apparatus with its cover removed, the cover being provided with a handle to facilitate carrying.

The apparatus comprises a generally L-shaped housing 1 onto which the cover releasably fits. A clockwork driven chart device 2 is mounted on the base of the housing and is arranged to drive a chart 3 at various desired speeds.

The apparatus also comprises detector means 4 sensitive to hydraulic pressure in a flexible hose 5 which has an adaptor 6 on its free end for connection to a hydraulic pressure system e.g. a mine roof support system, and which is connected at its other end to the detector means 4 via hydraulic connector means constituted by a pipe 7. The detector means 14 comprises a coiled hollow Bourdon tube gauge 8 connected at its lower end to the pipe 7 and connected at its upper end via a bracket 9 and pivot mounting 10 tO a small lever 11. The lever 11 is pivotally interconnected by a link 12 to another small lever 13 supported on a further pivotal mounting 14 which has an arm 15 fixedly secured to it. The arm 15 carries a pen 16 in a holder 17 which is pivotally mounted on the end of the arm and which can be manually rotated to adjust the position of the pen tip. The arm 15 has a hinge 18 which permits the pen tip to be raised from the chart 3 when necessary i.e. when it is desired to adjust the position of the pen tip, or of the arm without marking the chart e.g. when it is desired to adjust or reset the zero position of the pen tip. A clip 20 is provided on the arm which abuts a curved abutment 21 fixedly mounted with respect to the housing 1. The clip 20 clips onto the abutment 21 when the arm 15 is raised sufficiently and retains the arm in the raised position. When it is desired to lower the arm the operator merely overcomes the slight force of the clip 20 and the arm is free to move until the pen tip contacts the chart. The abutment 21 is curved to facilitate the contact with the clip 20 throughout the pivotal range of arm.

An adjustment screw 24 is provided for adjusting the zero setting of the arm 15.

The apparatus also comprises a spring loaded drum 25 which has a helical grove and which is rotatably supported by a bracket 26 secured to the upright wall of the housing 1. The drum 25 is biassed so as to tend to rotate anti-clockwise as seen in the drawing. A Bowden cable 27 is attached to the apparatus, one end of its inner wire 28 being attached to and wound around the drum 25 within the helical grove, with the associated end of its outer sheath 29 secured to the housing 1. The drum 25 is tending to haul the inner wire 28 around the drum. The free end of the Bowden cable is provided with means comprising abutment stops 30, 31 for attachement with suitable abutments provided on two relatively movable members (not shown) e.g. the piston member and cylinder member of a hydraulic prop constituting part of the previously mentioned mine roof support.

The drum 25 is drivably connected to a gear wheel 32 which in turn is drivably connected to a train of gear wheels including a gear wheel 33 which in turn drives the drive shaft 34 of a gear box 35, the drive shaft 34 extending through the gear box 35 to engage the train of gears. The gear box 35 has a vertical output shaft 36 which is located slightly in front of the pivotal mounting 14 and to which is fixedly secured an hinged arm 37 which carries a pen 38 in a holder 39 pivotally mounted on the end of the arm 37. The holder 39 can be manually rotated to adjust the position of the pin top and as with the arm 15 the hinge 40 permits the pen tip to be raised from the chart 3 when necessary. A clip 41 is provided which engages with an abutment (not shown) provided on the cover for retaining the arm 37 in its raised position.

The gear mechanism 32, 33, 35 has a 4:1 reduction so that the inner and outer part of the Bowden cable can be relatively displaced by say twelve inches while the pen 38 on the arm 37 moves fully across the three inch width of the chart 3.

In order to protect the gear box 34 from excessive displacements of the Bowden cable a stop (not shown) is provided on the gear wheel 33. Since the drum 25 is required to rotate more than one full revolution for maximum allowable displacement of the Bowden cable the gear wheel 33 has a relatively large diameter compared with the diameter of the gear wheel 32 which rotates with the drum 25. Thus for a full revolution of the drum 25 and the gear wheel 32 the gear wheel 33 rotates only a part of a revolution and the stop can be located on the gear wheel 33 at the pre-selected position to permit the desired number of revolutions of the drum 25.

In operation the recording apparatus is placed adjacent to the mine roof support and the adaptor 6 is connected to the hydraulic system of the support and the abutment stops 30, 31 are engaged on the abutment stops provided on the piston and cylinder members of the selected hydraulic prop of the roof support.

The device 2 is then fully wound and set into motion so that the chart 3 moves at the desired speed. The pens 16 and 38 are lowered onto the opposite sides of the chart and their zero positions adjusted by rotation of the holders 17 and 39 or by adjustment of the screw 24.

The arms 15, 37 are of equal length but since the pivotal mounting 36 for the arm 37 is slightly in front of the pivotal mounting 14 for the arm 15 the pen 38 is slightly forward and just clear of the pen 16. Also the arm 37 is above the pen 16 so that both arms are free to move across the full width of the chart 3 which is provided with curved lines which have their centre of curvature approximately half way between the two pivotal mountings 14, 36. The curved lines on the chart 3 are selected so that the zero position of one pen tip falls on one curved line and the zero position of the other pen tip falls on the next adjacent curved line.

Once the recording equipment is set up and running the adjustable abutment stop 31 is adjusted so that the abutment stops 31, 32 are fixedly located on the abutment stops on the hydraulic prop. Pressure fluid is also fed along the hose 5 to the Bourdon tube gauge 8 so that the pressure is recorded by movement of the pen 16 across the chart 3.

The recording apparatus is then left in place so that as mineral is won from the face and the roof support is released from its roof supporting position, advanced and re-set to its roof supporting position, the hydraulic pressure and convergence of the support is recorded.

Once the support is reset to its roof supporting position the recording apparatus simultaneously records variations in the hydraulic pressure of the roof support system and any lowering of the support due to convergence of the mine roof.

The recording apparatus is left for a desired period and gives a clear recording of the observed conditions throughout the period.

The record provides information which is of great value in future roof support design and in the selection of the type of roof support which may be particularly suitable for any installation.

We claim:

1. Recording apparatus comprising a housing, detector means sensitive to hydraulic pressure, hydraulic connector means for connecting the detector means to a source of hydraulic pressure, an arm connected to the detector means and movable in response to movement of the detector means, marker means provided on the arm for marking moving-chart means, a spring loaded drum assembly, a Bowden cable connected at one end to the houSing and to the spring loaded drum and being adapted at the other end for attachment to two relatively movable members, a mechanism interconnecting the spring loaded drum assembly to a further arm movable in response to rotation of the drum, and further marker means provided on the said further arm for marking the said moving-chart means.

2. Recording apparatus as claimed in claim 1, in which the said mechanism comprises gears and a gearbox and a stop to limit the amount of rotation of the gears.

3. Recording apparatus as claimed in claim 2, in which the spring loaded drum assembly comprises a rotatable drum with a helical grove for accommodating the associated part of the Bowden cable.

4. Recording apparatus comprising a housing, detector means sensitive to hydraulic pressure, hydraulic connector means for connecting the detector means to a source of hydraulic pressure, an arm connected to the detector means and movable in reSponse to movement of the detector means, a spring loaded drum assembly, a Bowden cable connected at one end to the housing and to the spring loaded drum and being adapted at the other end for attachment to two relatively movable members, a mechanism interconnecting the spring loaded drum assembly to a further arm movable in response to rotation of the drum, further marker means provided on the said further arm for marking the said moving-chart means, abutment means provided on the housing, and spring loaded clip means provided on each of the said arms and arranged to locate on the said abutment means when the associated marker means is disengaged from the moving-chart means.

5. Recording apparatus as claimed in claim 4, in which the said arms are pivotally mounted and the said abutment means are curved to facilitate location by the associated clip means irrespective of the marker means position across the moving-chart means.

6. Recording apparatus as claimed in claim 5, in which the said marker means and the said further marker means comprise pens which are pivotally mounted on the associated arm to facilitate adjustment of the pen tip relative to the associated arm.

* * * * *